J. H. WAGENHORST.
VEHICLE WHEEL RIM.
APPLICATION FILED JULY 22, 1911.

1,177,458.

Patented Mar. 28, 1916.

WITNESSES

INVENTOR
James H. Wagenhorst
BY
Edward Davis ATTORNEY

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,177,458.

Specification of Letters Patent.   Patented Mar. 28, 1916.

Application filed July 22, 1911. Serial No. 639,953.

*To all whom it may concern:*

Be it known that I, JAMES H. WAGENHORST, a citizen of the United States, residing at Akron, county of Summit, and State of Ohio, have invented certain new and useful Improvements in Vehicle-Wheel Rims, of which the following is a specification.

My invention relates to improvements in vehicle wheel rims of the type designed to carry pneumatic or other resilient tires and particularly to rims of this type in which one or more removable and reversible side flanges are provided, so formed as to be adapted to receive one form of tire, such as a clencher tire having projecting beads, when arranged in one position, and to receive a different form of tire, such as a straight-sided or Dunlop tire, when arranged in reverse position. By my improved construction, which will be hereinafter described in detail, I produce a stronger rim while at the same time materially reducing the weight of the structure. The latter is a point of great importance, as weight on the wheel of a vehicle is, as is well known, peculiarly objectionable, and also where a number of extra rims fitted with tires are to be carried, as is now very common practice, the reduction of the weight of these extra rims is of very material benefit.

My improved structure also has the advantage that when embodied in a rim comprising a transversely split tire-seating member or rim base provided with one or more endless tire-retaining flanges, the bases of these flanges interlock beneath the inturned or hooked flanges on the edges of the rim base and serve to lock the same against accidental collapse before the rim is mounted upon the wheel.

Figures 1, 2:
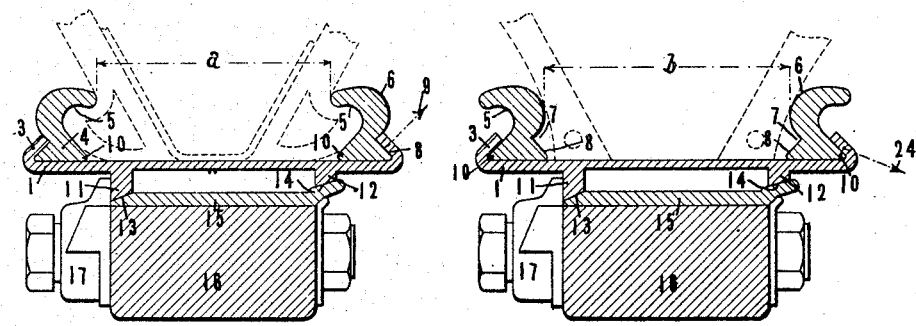
Figure 3:
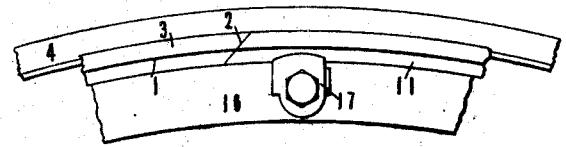
Figure 4:
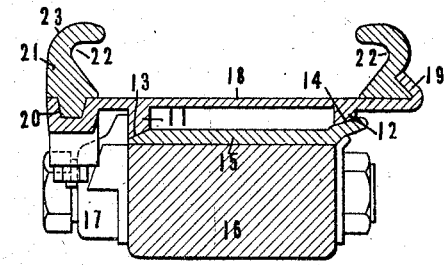
Figure 5:
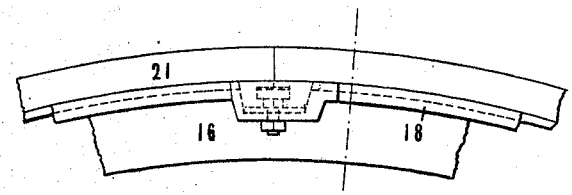

In the accompanying drawings which form a part of this specification, Figure 1 is a transverse sectional view through a wheel felly, felly band and rim, the latter embodying a preferred form of my invention; Fig. 2 is a view similar to Fig. 1, showing the tire-retaining flanges reversed and arranged in position to retain a straight-sided tire, the lower portion of which is indicated in dotted lines; Fig. 3 is a side elevation of a portion of the felly and rim illustrated in Fig. 1, showing the transversely split rim base; Fig. 4 is a view similar to Fig. 1, illustrating a modified form of my invention; Fig. 5 is a side elevation of the parts shown in Fig. 4, illustrating the means for locking the ends of the split removable side flange.

In this specification and in the drawings accompanying the same I have described and shown certain preferred embodiments of my invention, but these embodiments are used merely for illustration, and I do not desire to limit myself to the details thereof any more than as specified in the claims, as my invention is capable of being embodied in many other structural forms.

Referring to the drawings in detail, and particularly to Figs. 1, 2 and 3, the numeral 1 designates a rim base or tire-seating member, which, as shown in Fig. 3, is transversely split at the point 2. This rim base is provided at one or both edges with inwardly inclined overhanging or hooked flanges 3 adapted to engage with, and retain upon the rim base, the endless tire retaining flanges 4. As will be understood, in some cases one endless retaining flange may be used, other means being provided to retain the other side of the tire, such as a retaining flange formed integrally with the rim base.

The retaining flanges 4 are each formed on one side with a groove 5 shaped to receive one of the projecting beads of a clencher tire, as indicated in dotted lines in Fig. 1. The other side of each flange is provided with a curved surface or roll 6 adapted to engage and support the foot of a straight-sided tire, the roll being for the purpose of preventing the cutting of the tire by the edge of the flange in case the tire becomes deflated while in use. It has heretofore been considered necessary to have this curved bearing surface follow the line of the foot of the tire continuously to the surface of the rim base in order to properly support the tire. I have found, however, that this is not necessary, but that if the tire is supported by the curved surface of the rim flange near the edge thereof, the action of the rim and tire is entirely satisfactory. I accordingly form in the flange a groove 7 shaped to receive the overhanging or hooked flange 3, the wall 8 of the groove preferably having the same inclination as the inner wall of the flange 3, so that it will be closely engaged by said flange. When the flanges are in the position shown in Fig. 1, therefore, that is, in position to retain a clencher tire, the walls 8 of the grooves 7 engage closely against the flanges 3 and the flanges are held firmly in position upon the rim base. The stress placed upon the tire-retaining flanges by an inflated clencher tire is approximately in the direction indicated by the arrow 9 in Fig. 1, this direction being, as will be seen, approximately normal to the surface 8 and the contacting inner surface of the flange 8. There is thus no tendency for the tire-retaining flange to roll or tilt over the flange 3, or for it to stretch over it by enlarging in diameter, as the stress is directly toward the inner surface of the flange and there is no component parallel with such surface, as where a vertical side flange is used. It will thus be seen that it is impossible for the tire-retaining flange to escape from the side flange on the rim base without actually shearing off the latter. A much stronger structure is thus produced than where a vertical side flange is used engaging a vertical face on the tire-retaining flange. At the same time a substantial saving in weight is possible, as the section is reduced by an amount equal to the sectional area of the groove 7. The resultant saving in weight of the tire-retaining flanges is very material, and owing to the increased strength of the improved structure, a further saving in weight may be effected by making all of the parts somewhat lighter.

When the rim is to be used to carry a straight-sided tire, the transversely split rim base is collapsed and the tire-retaining flanges removed, and replaced in reversed position, as indicated in Fig. 2. When in this position the toe 10 of each tire-retaining flange enters the space beneath the corresponding flange 3 and seats securely therein. The flanges 3 are preferably given just the proper inward inclination to fit the toe of a tire-retaining flange provided with a groove for a clencher bead of standard dimensions. The resultant stress placed upon the tire-retaining flange by a straight-sided tire is in approximately the direction indicated by the arrow 24 in Fig. 2, and, as will be seen, such stress will have a tendency to force the toe of the flange always more firmly into its seat. The outwardly curved edges or rolls 6 of the tire-retaining flanges give the sides of the tire adequate support at the point where support is needed, and also provide rounded surfaces to support the tire if it should be necessary to use the same temporarily while deflated. It is also possible to so proportion the parts that the space between the tire supporting surfaces of the tire-retaining flanges when mounted in position to support a straight-sided tire, this distance being represented by the dimension $b$ in Fig. 2, shall be somewhat greater than the distance between the edges of the flanges when mounted in position to retain a clencher tire, as indicated by the dimension $a$ in Fig. 1. The dimension $b$ is preferably about one-tenth of an inch greater than the dimension $a$. The inturned or hooked formation of the flanges 3 has another important function. When a transversely split rim base or rim has been used heretofore it has ordinarily been found necessary to provide means for locking the rim against accidental collapse when removed from the felly. The felly will ordinarily prevent such collapse when the rim is mounted thereon, but it is the usual practice to carry one or more of these rims provided with inflated tires to be substituted upon the felly in case of accident. In such case, of course, the rim receives no internal support and must be securely held from collapsing under the pressure of the inflated tire. With the construction shown such collapse is effectually prevented by the engagement of the base portions of the tire-retaining flanges beneath the flanges 3. The expansion of the inflated tire holds these parts in secure engagement, and it is therefore impossible for the rim base to collapse. The endless flanges also prevent the undue expansion of the rim base, so that no locking means whatever are required for the ends of the latter.

For removably mounting the rim base upon the wheel felly, any suitable means may be used, these means, however, forming no part of my present invention. For example, the rim base may be provided with inwardly or downwardly projecting flanges 11 and 12 engaging beveled surfaces 13 and 14 of a felly band 15 permanently mounted upon the felly 16. The beveled surfaces on the rim base and felly band may be forced into engagement by means of the rotatable eccentric keepers 17, or by any other suitable devices. The specific construction of the rotatable keepers is not set forth herein, as the same is fully described, illustrated and claimed in my co-pending application Serial Number 589,680, filed October 29, 1910. I do not wish to be understood, however, as limiting myself to the use of these means in connection with the invention of this case.

In Figs. 4 and 5 I have shown my invention as applied to the modified form of rim in which the rim base 18 is endless, it being provided at one side only with an inwardly turned or hooked flange 19 adapted to engage an endless tire-retaining flange 4 of the form already described. At the other side the rim base is provided with a channel 20 adapted to receive a portion of a reversible transversely split tire-retaining flange 21 having the clencher groove 22 in one face thereof, and having a roll portion 23 on the other face thereof for engagement with a straight-sided tire. The split flange may be retained in its groove in any suitable manner, as by means of the locking device shown in Fig. 5, which is that fully set forth and claimed in Patent Number 912,537, granted to Richard S. Bryant on February 16, 1909. As will be obvious, this is merely an illustration of one form of rim to which my invention is applicable.

Having thus described my invention, I claim:

1. A vehicle wheel rim comprising a rim base having an inwardly hooked flange formed at one side thereof and a reversible tire-retaining flange having one side shaped to engage a clencher tire and the other side shaped to engage a straight-sided tire, the base portion of said flange having outwardly flaring faces, one of the faces lying against the under-side of the hooked portion of the rim base, their contacting surfaces being normal to the stress exerted by an inflated tire, the other face conforming to the hooked portion of the rim and having a toe seated in the hook upon reversal of the tire retaining flange.

2. A vehicle wheel rim comprising a rim base having an inwardly hooked flange formed at one edge thereof and a reversible tire-retaining flange adapted to be retained upon said rim base by said hooked flange, said tire-retaining flange having one side shaped to engage a clencher tire and the other side shaped to engage a straight-sided tire, and having wedge portions on each side thereof adapted alternately to fit in the recesses beneath said hooked flange, the wedge portions having the same inclination to the base.

3. A reversible tire-retaining flange for vehicle wheel rims having in one face a clencher groove 5, the inner portion of said side being formed into a toe 10 having an inclined outer face, the other side of said flange having a curved surface or roll 6 adapted to support a straight-sided tire, said side of the flange having formed inside of said curved surface a groove 7, the inner wall 8 of which is inclined to form a bearing surface, the inclinations of the outer surface of the toe 10 and of the wall 8 being equal in degree but opposite in direction.

4. A vehicle wheel rim comprising a transversely split rim base having means for retaining one side of a tire at one edge thereof and having at the other edge thereof an inwardly hooked flange, and an endless reversible tire-retaining flange mounted on said rim base, one side of said tire-retaining flange having a clencher groove therein, the other side of said flange being formed to engage a straight-sided tire, the base of said tire-retaining flange being of dovetail section, the side portions of which have substantially the same inclination to the base.

5. A vehicle wheel rim comprising a transversely split rim base having inwardly inclined flanges at each edge thereof whereby annular recesses of wedge-shaped section are formed at each edge of the rim base, and endless reversible tire-retaining flanges mounted on said rim base and having bases of dovetail-shaped section, the wedge-shaped side portions of said bases adapted to interchangeably fit into the wedge-shaped recesses formed beneath said inclined flanges.

6. A vehicle wheel rim comprising a rim base having an inwardly hooked portion at each edge thereof and a pair of similar reversible tire-retaining flanges adapted to engage said hooked portions of the rim base, each of said flanges having one side shaped to engage a clencher tire and the other side shaped to engage a straight-sided tire, and having a base portion of dovetail section with sides of equal inclination to the base, said inclination being the same as that of the hooked portion of the rim base with which the flange is adapted to engage.

JAMES H. WAGENHORST.

Witnesses:
EDMUND QUINCY MOSES,
KARL S. DIETZ.